United States Patent
LaColla et al.

(10) Patent No.: US 8,718,730 B1
(45) Date of Patent: *May 6, 2014

(54) MOBILE DEVICE CASE WITH CUSHION DEVICES

(71) Applicant: Superior Communications, Inc., Irwindale, CA (US)

(72) Inventors: Charlie LaColla, Woodland Hills, CA (US); Vivian Chou, Diamond Bar, CA (US); Jason Pan, Los Angeles, CA (US); Shraddha Patel, Walnut, CA (US)

(73) Assignee: Superior Communications, Inc., Irwindale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,852

(22) Filed: Aug. 12, 2013

Related U.S. Application Data

(63) Continuation of application No. 13/691,529, filed on Nov. 30, 2012, now Pat. No. 8,509,865.

(51) Int. Cl.
*H04M 1/00* (2006.01)

(52) U.S. Cl.
USPC ............... 455/575.8; 455/566.41; 455/557; 455/552.1

(58) Field of Classification Search
USPC .............. 455/575.8, 566, 41.2, 557, 552.1
See application file for complete search history.

(56) References Cited

U.S. PATENT DOCUMENTS

| | | |
|---|---|---|
| 3,081,672 A | 3/1963 | Anderson |
| 4,071,065 A | 1/1978 | Halbich |
| 4,512,095 A | 4/1985 | Seely |
| 4,536,979 A | 8/1985 | Parkinson |
| 4,896,787 A | 1/1990 | Delamour et al. |
| 4,993,866 A | 2/1991 | Sugihara et al. |
| 5,025,921 A | 6/1991 | Gasparaitis et al. |
| D323,503 S | 1/1992 | Yoneyama et al. |
| 5,265,720 A | 11/1993 | Meliconi |
| 5,292,060 A | 3/1994 | Focke et al. |
| D348,472 S | 7/1994 | Cyfko |
| 5,360,108 A | 11/1994 | Alagia |
| D353,783 S | 12/1994 | Burns |
| 5,380,119 A | 1/1995 | Hadden |
| D357,918 S | 5/1995 | Doria |
| D389,158 S | 1/1998 | Oross |
| 5,816,459 A | 10/1998 | Armistead |
| 5,896,277 A | 4/1999 | Leon et al. |
| D412,501 S | 8/1999 | Tyneski et al. |

(Continued)

FOREIGN PATENT DOCUMENTS

| | | |
|---|---|---|
| EP | 1096759 | 5/2011 |
| JP | 2008-018637 | 1/1996 |

(Continued)

OTHER PUBLICATIONS

Internet Publication, Jerrod H., "SBS Innovations iShok 5G Video", Nov. 17, 2006; 4 pages.

(Continued)

*Primary Examiner* — Joseph Arevalo

(74) *Attorney, Agent, or Firm* — Snell & Wilmer LLP

(57) ABSTRACT

A case for a mobile device including a base wall and a plurality of side walls extending from the base wall to cover side surfaces of the mobile device. A plurality of cushion devices may pass through the side walls to cushion the mobile device from a force exerted upon the case.

20 Claims, 18 Drawing Sheets

(56) References Cited

U.S. PATENT DOCUMENTS

| | | |
|---|---|---|
| D459,346 S | 6/2002 | Powell |
| 7,343,184 B2 | 3/2008 | Rostami |
| 7,428,427 B2 | 9/2008 | Brunstrom et al. |
| 7,555,325 B2 | 6/2009 | Goros |
| 7,609,512 B2 | 10/2009 | Richardson et al. |
| D606,305 S | 12/2009 | Lee et al. |
| D623,651 S | 9/2010 | Hsu |
| D623,652 S | 9/2010 | Hsu |
| D634,313 S | 3/2011 | Fitzpatrick et al. |
| 7,907,394 B2 | 3/2011 | Richardson et al. |
| 7,933,122 B2 | 4/2011 | Richardson et al. |
| D638,006 S | 5/2011 | Chang |
| D638,007 S | 5/2011 | Chang |
| 7,938,260 B2 | 5/2011 | Lin |
| D649,538 S | 11/2011 | Magness et al. |
| 8,073,131 B2 | 12/2011 | Bodkin et al. |
| D656,135 S | 3/2012 | Swartz et al. |
| 8,204,561 B2 | 6/2012 | Mongan et al. |
| D662,925 S | 7/2012 | Mayberry et al. |
| 8,245,842 B2 | 8/2012 | Bau |
| 8,295,043 B2 | 10/2012 | Tai et al. |
| D670,279 S | 11/2012 | Veltz et al. |
| D673,552 S | 1/2013 | Weller et al. |
| D674,789 S | 1/2013 | Wen |
| D675,604 S | 2/2013 | Limber et al. |
| D675,605 S | 2/2013 | Adelman et al. |
| D675,606 S | 2/2013 | Adelman et al. |
| D678,262 S | 3/2013 | Prato |
| 8,509,865 B1 | 8/2013 | LaColla et al. |
| 2001/0002003 A1 | 5/2001 | Kuzak et al. |
| 2003/0103624 A1 | 6/2003 | Hu |
| 2006/0289030 A1 | 12/2006 | Pho |
| 2007/0081303 A1 | 4/2007 | Lam et al. |
| 2007/0225031 A1 | 9/2007 | Bodkin et al. |
| 2008/0039161 A1 | 2/2008 | Chan |
| 2009/0009941 A1 | 1/2009 | Hsu et al. |
| 2009/0084432 A1 | 4/2009 | Kosmehl |
| 2009/0111543 A1 | 4/2009 | Tai et al. |
| 2010/0096284 A1 | 4/2010 | Bau |
| 2010/0203931 A1 | 8/2010 | Hynecek et al. |
| 2011/0055447 A1 | 3/2011 | Costa |
| 2011/0294542 A1 | 12/2011 | Ray et al. |
| 2012/0329535 A1 | 12/2012 | Kuo |
| 2013/0045782 A1 | 2/2013 | Simmer |

FOREIGN PATENT DOCUMENTS

| | | |
|---|---|---|
| JP | 2000-139537 | 5/2000 |
| JP | 2002-027076 | 1/2002 |
| JP | 2007-095112 | 4/2007 |
| KR | 20-0407284 | 1/2006 |
| KR | 10-0862125 | 9/2008 |
| WO | WO 94/28565 | 12/1994 |
| WO | WO 2008/032891 | 3/2008 |
| WO | WO 2008/078087 | 7/2008 |
| WO | WO 2009/117864 | 1/2009 |

OTHER PUBLICATIONS

Internet Publication, Scosche Industries Press Room, "Industry-Leading Company Offers Unique Cases for Popular Products", Jan. 8, 2008; 5 pages.
Internet Publication, Jeremy Horwitz, iLounge "Incipio Silicrylic for iPhone 3G", Aug. 7, 2008; 4 pages.
Internet Publication, "Griffin iPhone Wave Case Review", May 19, 2008; 4 pages.
Internet Publication, Griffin Clarifi, Protective Case with built-in-close-up lens for iPhone 3G and 3GS; 3 pages.
Internet Publication, Jeremy Horwitz, iLounge, "SwitchEasy Capsule Rebel for iPhone 3G", Jul. 31, 2008; 9 pages.
Internet Publication, Jeremy Horwitz iLounge, "Incipio Silicrylic Case for iPhone", Jul. 31, 2007; 4 pages.
Internet Publication, Chrisopher Meinck, "Ballistic Life Style iPhone 4/4s Case review", Oct. 21, 2011; 11 pages.
Internet Publication, Roman Loyola, "Silicone iPhone Suits", Oct. 8, 2007; 5 pages.
PureGear DualTek Case for Samsung GalaxyS3, webpage, 2013, <URL:https://www.superiorcommunications.com/Products/Products_Details.aspx?sku=89978VRP>, retrieved from internet on Oct. 15, 2013.
PureGear mobile device accessories webpage, 2013. <URL:https://www.superiorcommunications.com/products/puregear.aspx>, retrieved from internet on Oct. 15, 2013.
Review of PureGear DualTek Case for Samsung Galaxy S III, published on Jul. 17, 2012, <URL:http://www.youtube.com/watch?v=ntalwj8Qak>, retrieved from internet on May 5, 2013.
Review of Samsung Galaxy S3 Soft Case, published on Jul. 19, 2012, <URL:http://www.androidauthority.com/samsung-galaxy-s3-soft-case-review-roundup-video-101860/>, retrieved from internet on May 5, 2013.

MOBILE DEVICE CASE WITH CUSHION DEVICES

CROSS REFERENCE TO RELATED APPLICATIONS

This application is a continuation of prior application Ser. No. 13/691,529, filed Nov. 30, 2012, the entire disclosure of which is incorporated herein by reference.

FIELD OF THE INVENTION

The present disclosure relates to protective cases for mobile devices.

BACKGROUND OF THE INVENTION

Mobile devices, in the form of phones, computers, digital assistants, and hand held devices have become commonplace in society. Cellular phones, for example, are now carried by individuals at work, at home, at play, and in a variety of other environments. The increased range of wireless communication coverage enhances the variety of environments in which wireless-enabled mobile devices may be used. It may not be unusual to see a mobile device used while an individual is at the beach, at the mall, near a river, walking over a rocky surface, or hiking up a mountain.

Cases have been developed that protect mobile devices from dirt and scratches that may accumulate from normal use. The cases may comprise a shell or other covering that extends over the mobile device so that dirt does not enter crevices of the mobile device, or so the outer finish of the device is not scratched. The rising costs of mobile devices may make it be worthwhile for an individual to invest in a case that protects the mobile device from dirt or scratches.

However, the variety of environments that mobile devices are now used in may demand greater protection for a mobile device. In addition, the increased amount of time that an individual spends holding a mobile device may increase the probability that the individual drops a mobile device. Cases that merely protect mobile devices from dirt and scratches may be insufficient to protect the device from impact applied directly to the case. The strength of such an impact may be great because users are now more likely to carry mobile devices over hard surfaces like concrete, asphalt, rocks, or the like. In addition, the variety of environments in which mobile devices are used may increase the probability that the individual's hands are slick, which allows the mobile device to more easily slip out of the user's hand (e.g., at the beach, at the gym). Such impact may crack, disengage, or otherwise damage electronic components within the mobile device, or may shatter a view screen or touch screen on the device.

SUMMARY OF THE INVENTION

The case disclosed herein is intended to address the need in the art identified by the inventors for greater impact resistance for a mobile device. The case is designed to provide enhanced anti-shock and vibration reduction capabilities than offered by cases designed to merely protect the mobile device from dirt and scratches. The case is designed to reduce the possibility of damage to the mobile device resulting from a force directly applied to the case.

In one embodiment, the case includes a base wall having an inner surface and an outer surface and that is configured to cover a surface of the mobile device. The case includes a plurality of side walls each having an inner surface and an outer surface and that is configured to cover a side surface of the mobile device.

The plurality of side walls extend from the base wall such that the inner surfaces of the plurality of side walls and the inner surface of the base wall form a recess configured to receive the mobile device. The inner surfaces of the plurality of side walls and inner surface of the base wall face towards the mobile device when the mobile device is received in the recess. The outer surfaces of the plurality of side walls and the outer surface of the base wall face away from the mobile device when the mobile device is received in the recess.

A plurality of side walls join to form at least four corners of the case. Each of the plurality of side walls join to an adjacent one of the side walls to form the at least four corners. An aperture is positioned at each corner and extends from the inner surface of at least one of the side walls to the outer surface of the at least one of the side walls.

Cushion devices extend through the apertures and are configured to cushion the mobile device from a force exerted upon the case. Each cushion device is removable from the aperture. A cushion device may be fixed to the inner surface of the base wall and may be configured to cushion the mobile device from a force exerted upon the case. The cushion device fixed to the base wall may extend from the inner surface of the base wall to a distance such that the mobile device contacts the cushion device and a gap exists between the mobile device and the inner surface of the base wall when the mobile device is received in the recess.

In one embodiment, the case includes a base wall having an inner surface and an outer surface and that is configured to cover a surface of the mobile device. The case includes a plurality of side walls each having an inner surface and an outer surface and that is configured to cover a side surface of the mobile device.

The plurality of side walls each have an inner surface and an outer surface and are configured to cover a side surface of the mobile device. The plurality of side walls extend from the base wall such that the inner surfaces of the plurality of side walls and the inner surface of the base wall form a recess configured to receive the mobile device. The inner surfaces of the plurality of side walls and inner surface of the base wall face towards the mobile device when the mobile device is received in the recess. The outer surfaces of the plurality of side walls and the outer surface of the base wall face away from the mobile device when the mobile device is received in the recess. The plurality of side walls have a plurality of apertures.

A plurality of cushion devices each extend through a respective one of the plurality of apertures and each is configured to cushion the mobile device from a force exerted upon the case. Each of the plurality of cushion devices are configured to be removable from respective one of the plurality of apertures. A cushion device may be fixed to the inner surface of the base wall and may be configured to cushion the mobile device from a force exerted upon the case. The cushion device fixed to the base wall may extend from the inner surface of the base wall to a distance such that the mobile device contacts the cushion device and a gap exists between the mobile device and the inner surface of the base wall when the mobile device is received in the recess.

BRIEF DESCRIPTION OF THE DRAWINGS

Features and advantages of the present invention will become appreciated as the same become better understood with reference to the specification, claims, and appended drawings wherein:

DETAILED DESCRIPTION OF THE PREFERRED EMBODIMENTS

Figure 1:
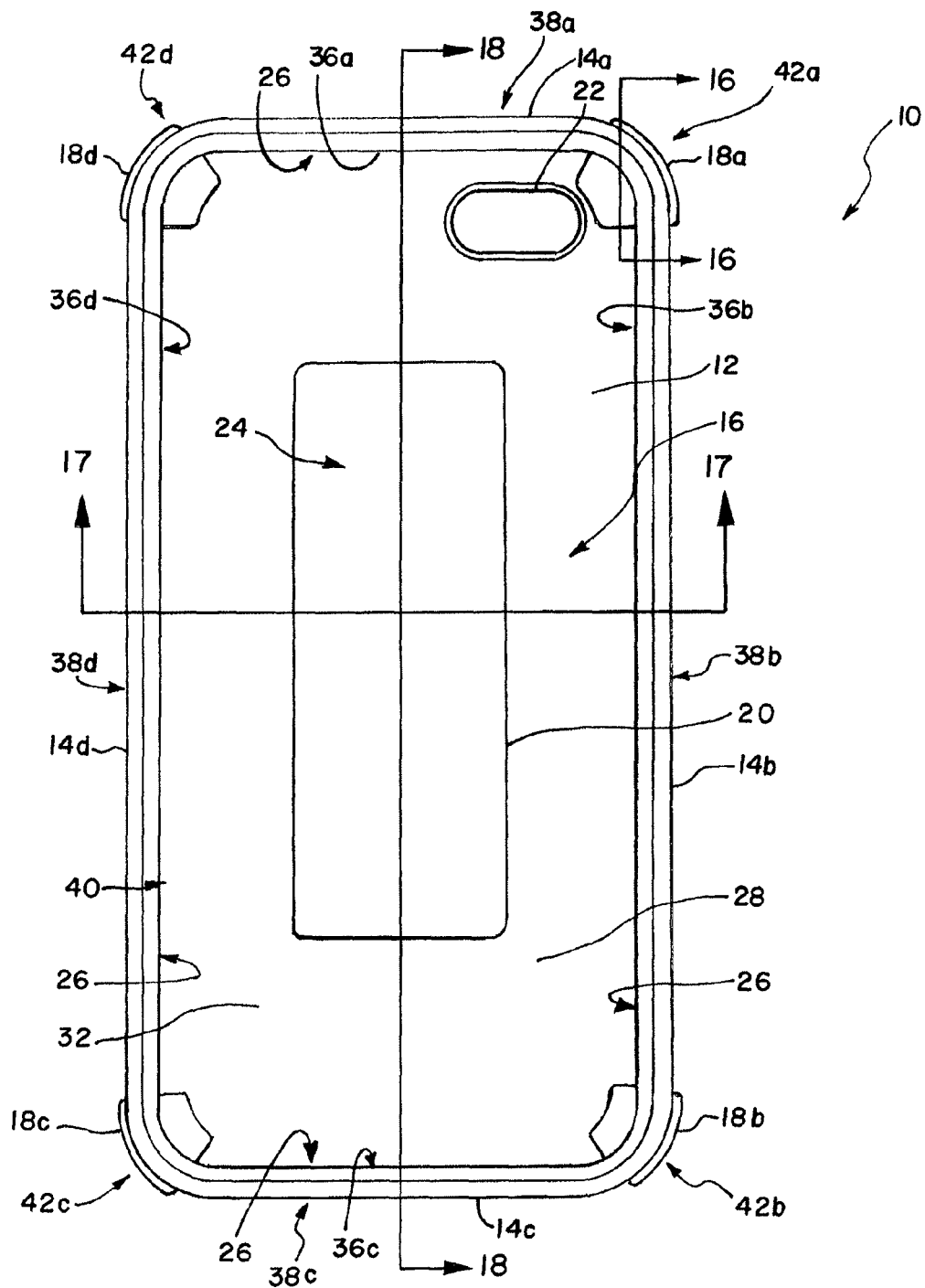
FIG. 1 illustrates a front view of a case for a mobile device, according to an embodiment of the present disclosure.

FIG. 1 illustrates a front view of a case 10 for a mobile device. The case 10 includes a base wall 12 and a plurality of side walls 14a-d (referred to collectively as 14). The side walls 14 extend away from the base wall 12 to form a recess 16 configured to receive the mobile device. A plurality of cushion devices 18a-d (referred to collectively as 18) extend through the side walls 14. A cushion device 20 is positioned upon the base wall 12. An aperture 22 is positioned on the base wall 12.

The base wall 12 is a covering that covers a surface of the mobile device that is received by the recess 16. The base wall 12 extends out from a central portion 24 of the case 10 to outer portions 26 of the case 10 to form the covering.

Figure 2:
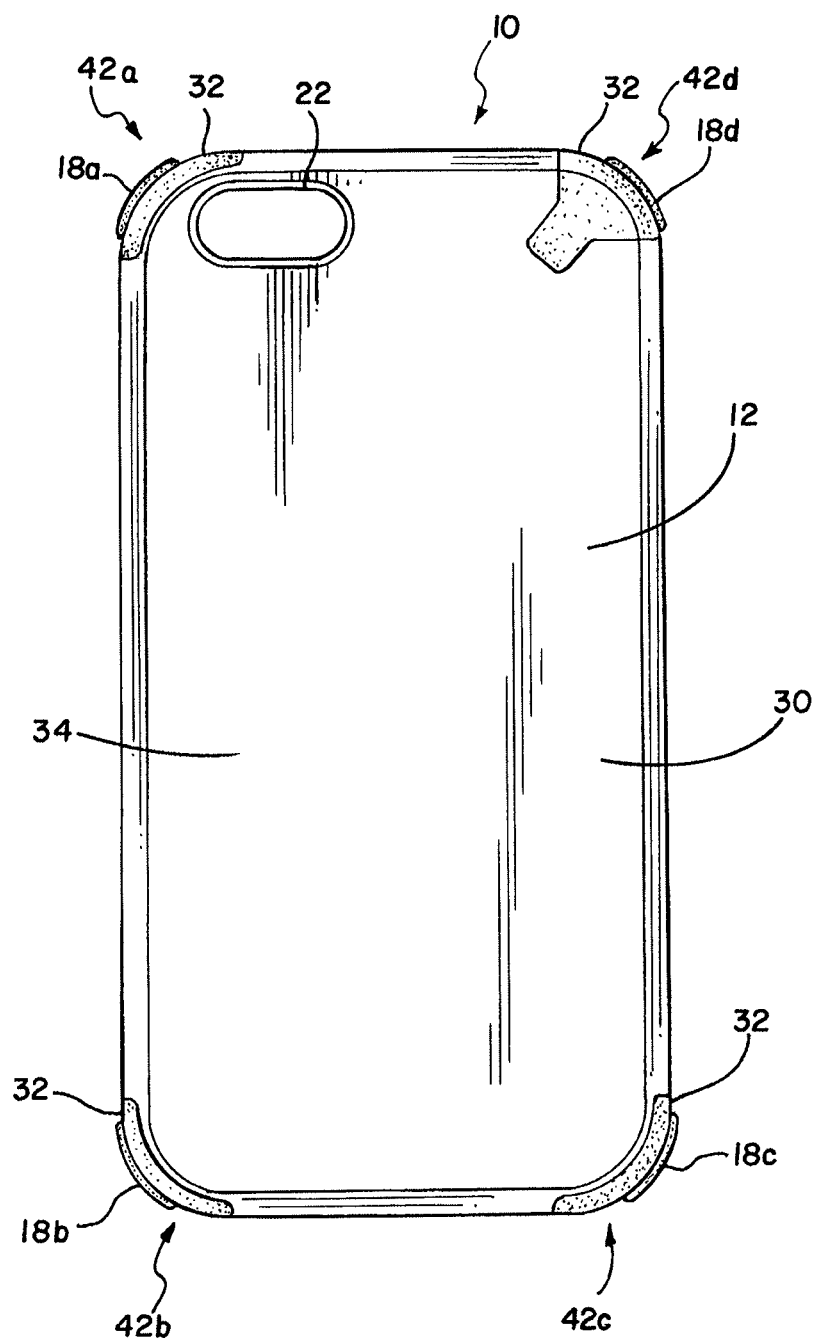
FIG. 2 illustrates a rear view of a case for a mobile device, according to an embodiment of the present disclosure.

The base wall 12 includes an inner surface 28 and an outer surface 30 (shown in FIG. 2). The inner surface 28 faces towards the mobile device when the mobile device is received in the recess 16. The outer surface 30 faces away from the mobile device when the mobile device is received in the recess 16.

The base wall 12 may have a substantially flat shape and extend in a single plane. The flat shape of the base wall 12 may match a shape of a portion of the mobile device to be retained by the case 10. For example, a back portion of the mobile device may have a substantially flat shape, and the base wall 12 similarly includes the flat shape to contour to the back portion of the mobile device. The contour of the base wall 12 forms a form-fit of the mobile device, to allow the case 10 to not be overly bulky when covering the mobile device.

The base wall 12 may extend outward from the central portion 24 of the case 10 to form a substantially rectangular shape. The rectangular shape may be formed to match the shape of a rectangular mobile device that is contained within the case 10. The outer portions 26 of the case 10 terminate at the outer portions of the mobile device that is contained therein.

The shape of the base wall 12 may be configured in any shape as desired based on the shape of the mobile device to be retained. For example, in one embodiment, the base wall 12 may have a curved shape. The curvature of the base wall 12 may match a shape of the portion of the mobile device to be retained. The base wall 12 may be dimensioned to match dimensions of the mobile device as desired, for example, the base wall 12 may be dimensioned to have a square, or oblong shape to match the dimensions of a mobile device as desired.

In one embodiment, the base wall 12 may not match the shape of the mobile device, but may have any shape that still allows the base wall 12 to cover a surface of the mobile device.

The base wall 12 may include a single layer or multi-layer construction. In the embodiment shown in FIG. 1, the base wall 12 has a multi-layer construction, including an interior layer 32 and an exterior layer 34 (shown in FIG. 2). The interior layer 32 forms a portion of the inner surface 28 of the base wall 12. The exterior layer 34 forms a portion of the exterior surface 30 of the base wall 12. The interior layer 32 and exterior layer 34 may be bonded or joined together in a manner that the layers 32, 34 are permanently combined together. In one embodiment, the layers 32, 34 may be molded together. In one embodiment, the interior layer 32 may be overmolded upon the exterior layer 34.

The interior layer 32 may be made of a pliable material that is sufficiently rigid to form a portion of the case 10, yet offers an amount of shock resistance for the mobile device contained therein. The interior layer 32 may comprise an elastomeric material, for example an elastomeric polymer or the like configured to provide shock resistance for the mobile device. In one embodiment, the interior layer 32 may be made from an elastomeric thermoplastic polyurethane. The exterior layer 34 (shown in FIG. 2) may be made of a material that is less pliable than the material of the interior layer 32, and may have a greater hardness than the material of the interior layer 32. The material of the exterior layer 34 may offer greater penetration resistance for the case 10 than the material forming the interior layer 32. The exterior layer 34 may comprise a hard plastic, for example, polycarbonate or the like. In other embodiments, the interior layer 32 and exterior layer 34 may be made of identical materials, or materials having similar properties, or may be made of any combination of materials as desired.

The side walls 14 extend from the base wall 12 to cover a side surface of the mobile device that is received in the recess 16. The combination of the side walls 14 and the base wall 12 forms a housing, or shell, of the case 10 for receiving the mobile device. The side walls 14 may extend from the outer edges of the base wall 12 to form the outer portions 26 of the case 10. The side walls 14 may be shaped to contour to the sides of the mobile device, to form a form-fit with the sides of the mobile device, such that the case 10 is not bulky upon the sides of the mobile device. In other embodiments, the side walls 14 may have any shape relative to the mobile device as desired to cover the sides of the mobile device.

Each of the side walls 14 includes a respective inner surface 36a, 36b, 36c, 36d (referred to collectively as 36) and an outer surface 38a, 38b, 38c, 38d (referred to collectively as 38). Each of the inner surfaces 36 face towards the mobile device when it is received in the recess 16. Each of the outer surfaces 38 face away from the mobile device when it is received in the recess 16.

The side walls 14 may extend upward from the base wall 12 to a distance that that extends over the side of the mobile device or matches the height of the side of the mobile device. In one embodiment, any of the side walls 14 may extend upward from the base wall 12 such that only a part of the side of the mobile device is covered.

Each of the side walls 14 may be formed of a continuous piece of material or may be formed of a material that includes apertures or cut-outs through any of the respective side walls 14. A portion of the interior layer 32 may extend from the base wall 12 to form a portion of any of the side walls 14 as desired. The portion of the interior layer 32 forming a part of the side walls 14 may be integral with the interior layer 32 of the base wall 12. In an embodiment in which the interior layer 32 is a pliable material, the pliability of the interior layer 32 as utilized by the side walls 14 may allow the side walls 14 to more easily bend to allow the mobile device to be more easily inserted into the recess 16.

A portion of the exterior layer 34 (shown in FIG. 2) may extend from the base wall 12 to form a portion of any of the side walls 14 as desired. The portion of the exterior layer 34 forming a part of the side walls 14 may be integral with the exterior layer 34 of the base wall 12. In an embodiment in which the exterior layer 34 is a rigid material, the rigidity of the exterior layer 34 as utilized by the side walls 14 may provide greater support for the side walls 14 to maintain their shape when the mobile device is received by the recess 16. In one embodiment, any of the side walls 14 may be formed from a single piece of material. In one embodiment, any of the side walls 14 may be formed from multiple pieces of material. In one embodiment, any of the side walls 14 may be formed from material that is not integral with a portion of the base wall 12.

The side walls 14 may extend from the base wall 12 in a direction that is substantially perpendicular, or ninety degrees from a direction the base wall 12 extends in. In the embodiment shown in FIG. 1, the base wall 12 has a substantially flat shape, with each of the side walls 14 similarly having a flat shape that extends in a direction substantially perpendicular to the plane of the base wall 12. In one embodiment, any of the side walls 14 may have a curved shape, yet may have a portion that extends in a direction substantially perpendicular to a direction that a portion of the base wall 12 extends in. In one embodiment, any of the side walls 14 may have any shape as desired relative to the base wall 12 such that a side surface of the mobile device is covered. The side walls 14 in combination may form a rim around the base wall 12 that allow side surfaces of the mobile device to be covered. The rim may extend around the sides surfaces of the mobile device to form corners that match the position of corners of the mobile device.

The side walls 14 may extend relative to each other in a direction that is substantially perpendicular or ninety (90) degrees from a direction that an adjacent one of the side walls 14 extends in. The side walls 14 may form a substantially rectangular, or box-like, shape that covers side surfaces of the mobile device. In one embodiment, any of the side walls 14 may have a curved shape, yet may have a portion that extends in a direction substantially perpendicular to a direction that an adjacent one of the side walls 14 extends in.

The combination of the inner surface 28 of the base wall 12 and the inner surfaces 36 of the side walls 14 form the recess 16 for receiving the mobile device. The recess 16 is bounded on its sides by the side walls 14. The recess 16 is bounded at its bottom by the base wall 12. The top of the recess opens into an aperture 40 that the mobile device passes through to be received by the recess 16. In the embodiment shown in FIG. 1, four side walls 14 bound the four sides of the recess 16. In one embodiment, any number of side walls 14 may be utilized to bound the recess 16 as desired. A recess 16 may be formed through use of two side walls extending at a distance from the base wall 12, with the distance defining the indentation or cavity that the mobile device is received in.

The cushion devices 18 extend through respective apertures 58a, 58b, 58c, 58d (referred to collectively as 58) (identified in FIG. 12) positioned in the side walls 14 that extend from the inner surfaces 36 of the side walls 14 to the outer surfaces 38 of the side walls 14. The apertures may be positioned at corners 42a, 42b, 42c, 42d (referred to collectively as 42) of the case 10. Side walls 14 adjacent to one another join at the respective corners 42, and form an angle relative to each other.

The cushion devices 18 are configured to cushion the mobile device from a force exerted upon the case 10. The cushion devices 18 may be formed from shock absorbing material, which may be elastic. Such materials may include an elastomeric material such as rubber, or the like. In one embodiment, the cushion devices 18 may be formed of material having a durometer between approximately 30-60. The cushion devices 18 may be made of a material that has greater resistance to shock than the materials forming the base wall and the side walls 14. The cushion devices 18 may be structured to substantially absorb a force, or part of a force, applied to the case 10 such that the entirety of the force is not transmitted directly to the mobile device. The cushion devices 18 may deform upon the force being applied, to absorb energy of the force. The cushion devices 18 may serve to reduce the possibility of damage to the mobile device if the case 10 is dropped or hit by an object.

The cushion devices 18 may additionally serve to reduce force that is transmitted to the remainder of the case 10. For example, the cushion devices 18 may reduce force applied to the base layer 12 or side walls 14 forming the housing or shell of the case 10. The cushion devices 18 may be removable from the apertures such that the cushion devices 18 are not permanently joined to the remainder of the case 10. The removable feature of the cushion devices 18 may serve to reduce the force that is transmitted to the remainder of the case 10. The cushion devices 18 may lack a chemical or electrical bond to the remainder of the case 10 that reduces the strength of the force transmitted thereto. In addition, the cushion devices 18 may be removable to allow different cushion devices 18, having different properties (e.g., hardness, durability, elasticity, and the like) to be inserted and placed in the apertures. The removable feature additionally may allow the cushion devices 18 to be more easily made of a different material than the base wall 12 or the side wall 14 of the case 10. The cushion devices 18 may be formed separate from the base wall 12 and side wall and then inserted manually into the apertures. The manual insertion process may reduce manufacturing expense, by reducing the need for a separate molding step to form the cushion devices 20 in place. In addition, the manual insertion process may allow a distributor to more easily select different cushion devices with different properties (e.g., hardness, durability, elasticity, and the like) to be inserted and placed in the apertures based on a particular shape or style of a desired mobile device. The case 10 may be fitted for a particular shape or style of mobile device after the factory manufacturing process takes place, for example, a salesperson may fit the case 10 in-store, or at the point of sale, for a particular mobile device. Although the cushion devices may be removable, in one embodiment, they may not be intended for the end-consumer to remove the cushion device, because the mobile device will not properly fit in the case 10 with the cushion devices removed. In addition, an end-consumer may damage a cushion device if they attempt to remove the cushion device from the case 10. In one embodiment, the cushion devices 18 may be permanently fixed to the side walls 14 of the case.

The cushion devices 18 may be positioned at any location desired along the side walls 14 to reduce a force from being transmitted to the mobile device. Preferably, the cushion devices 18 are positioned at the corners 42 of the case 10 to stabilize the mobile device at its vertices. In addition, a force applied directly to the case corners 42 will likely be more focused because it is not distributed along a long surface of the case 10, such as along a length of one of the side walls 14 or the length of the outer surface 30 of the base wall 12 (shown in FIG. 2). The cushion devices 18 at the corners may dissipate this focused force and reduce its transmission to the mobile device.

The number of cushion devices 18 utilized may also be varied. Preferably, in an embodiment in which the cushion devices 18 are positioned at the corners 42 of the case, a cushion device 18 will be positioned at each corner. For an embodiment in which the mobile device has four corners, then four cushion devices 18 may be utilized. However, shock absorption may still be provided if a cushion device 18 is not positioned at each corner. In one embodiment, only one cushion device 18 may be utilized at one corner, to provide some shock absorption for the mobile device. In an embodiment in which cushion devices 18 are positioned at multiple locations along the side walls 14, any number of cushion devices 18 may be utilized as desired to provide shock absorption. Cushion devices 18 may extend through apertures positioned in the middle of each of the side walls 14, for example.

The cushion device 20 positioned upon the base wall 12 may be configured to cushion the mobile device from a force exerted upon the case 10, similar to the cushion devices 18 extending through the side walls 14. The cushion device 20 positioned upon the base wall 12 may be referred to as a base wall cushion device 20 and the cushion devices 18 extending through the side walls 14 may be referred to as side wall cushion devices 18. The base wall cushion device 20 may be formed from shock absorbing material, which may be elastic. Such materials may include an elastomeric material such as rubber, or the like. In one embodiment, the cushion devices 18 may be formed of material having a durometer between approximately 30-60. The base wall cushion device 20 may be made of a material that has greater resistance to shock than the materials forming the base wall 12 and the side walls 14. The base wall cushion device 20 may be structured to substantially absorb a force, or part of a force, applied to the case 10 such that the entirety of the force is not transmitted directly to the mobile device. The base wall cushion device 20 may deform upon the force being applied, to absorb energy provided by the force. The base wall cushion device 20 may serve to reduce the possibility of damage to the mobile device if the case 10 is dropped or hit by an object.

The base wall cushion device 20 may not be formed integrally with the base wall 12. The base wall cushion device 20 may be formed separate from the base wall 12 to allow the cushion device 20 to be made of a different material than the base wall 12. The base wall cushion device 20 may be formed separate and fixed to the base wall 12 through an adhesive, or may be mechanically joined to the base wall 12. In one embodiment, the base wall cushion device 20 may be formed integral with the base wall 12 through a molding process.

The base wall cushion device 20 is preferably positioned at a central location along the base wall 12, as shown in FIG. 1. However, the base wall cushion device 20 may be positioned at variable locations as desired. Any number of additional base wall cushion devices 20 may be utilized, for example, sufficient numbers of cushion devices 20 may be utilized to substantially entirely cover the base wall 12.

The base wall cushion device 20 is preferably shaped to have a surface area that contacts a surface of the mobile device at multiple locations. Contact at multiple locations allows any force transmitted through the cushion device 20 to be distributed to the multiple locations on the surface of the mobile device. The base wall cushion device 20 preferably has a substantially flattened or planar contact surface that contacts the surface of the mobile device and distributes the reduced force substantially evenly along the contact surface. The base wall cushion device 20 may have any outline or dimensional shape, as desired, including a rectangular shape as shown in FIG. 1, or a diamond, or circular shape, as desired.

The aperture 22 is positioned on the base wall 12 and extends from the inner surface 28 to the outer surface 30 of the base wall 12. The aperture 22 is configured to allow an element of the mobile device to be utilized through the case 10. The aperture 22 shown in FIG. 1, for example, corresponds to a camera used by the mobile device. The base wall 12 and side walls 14 may include any number of apertures or cut outs as desired, to correspond to an element of the mobile device or to otherwise allow access to the mobile device through the case 10. Apertures or cut outs may be positioned in the base wall 12 and any of the side walls 14 to reduce the weight of the case 10, for example.

FIG. 2 illustrates a rear view of the case 10 showing the outer surface 30 of the base wall 12. The exterior layer 34 of the base wall 12 forms a portion of the outer surface 30 of the base wall 12. The interior layer 32 of the base wall 12 may pass through a portion of the exterior layer 34 to form a portion of the outer surface 30 of the base wall 12. In the embodiment shown in FIG. 2, the interior layer 32 extends through the exterior layer 34 at the corners 42 of the case 10. In one embodiment, the interior layer 32 may not extend through the exterior layer 34. In one embodiment, the interior layer 32 may pass through any portion of the exterior layer 34 as desired. In an embodiment in which the interior layer 32 is a pliable material, and the exterior layer 34 is a rigid material, the proportionate amount of interior layer 32 that extends through the exterior layer 34 may be determined based on the total amount of pliability or rigidity desired for the case 10.

Figure 3:
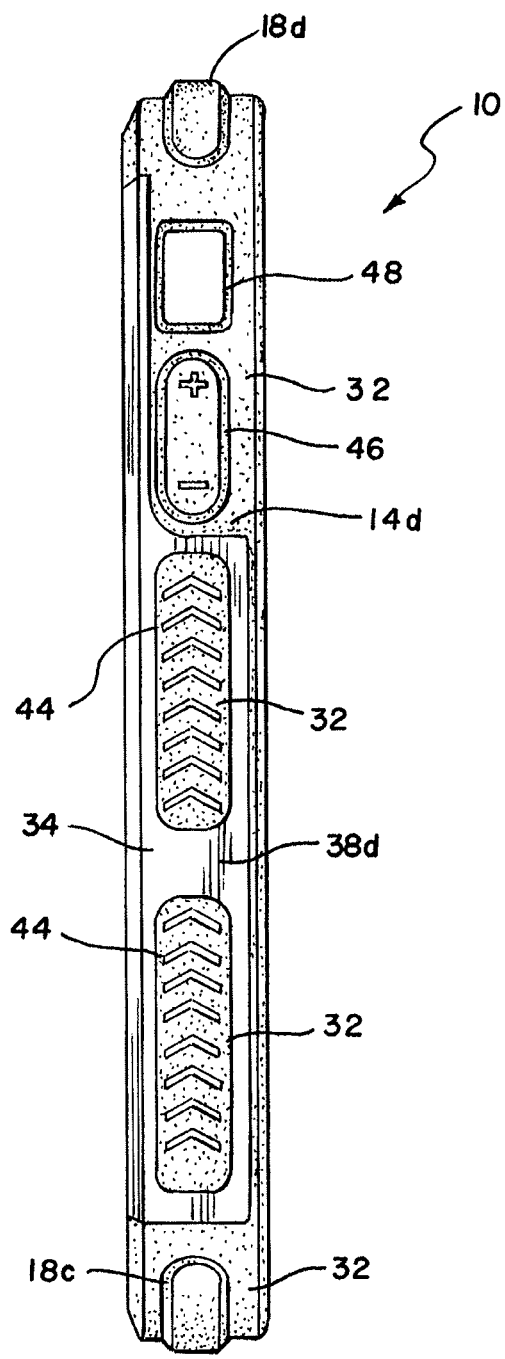
FIG. 3 illustrates a side view of a case for a mobile device, according to an embodiment of the present disclosure.

FIG. 3 illustrates a side view of the case 10 showing the outer surface 38d of one of the side walls 14. The exterior layer 34 extends upward from the base wall 12 (shown in FIG. 2) to form a portion of the outer surface 38d of the side wall 14*d*. The interior layer 32 of the base wall 12 extends upward from the base wall 12 to form a portion of the outer surface 38*d* of the side wall 14*d*. The interior layer 32 may pass through a portion of the exterior layer 34.

The interior layer 32 may form grips 44 on the outer surface 38*d* of the side wall 14*d*. The grips 44 are configured to reduce the possibility that the case 10 slips from a user's hand while the case 10 is being gripped. The interior layer 32 may also form depressible portions 46 on the outer surface 38*d* of the side wall 14*d*. The depressible portions 46 may be used to transmit a force to elements on the mobile device, including buttons, for example. An aperture 48 may be positioned on the side wall 14*d* to allow access to the mobile device through the case 10. The aperture 48 shown in FIG. 3 allows access to a switch on the mobile device.

Figure 4:
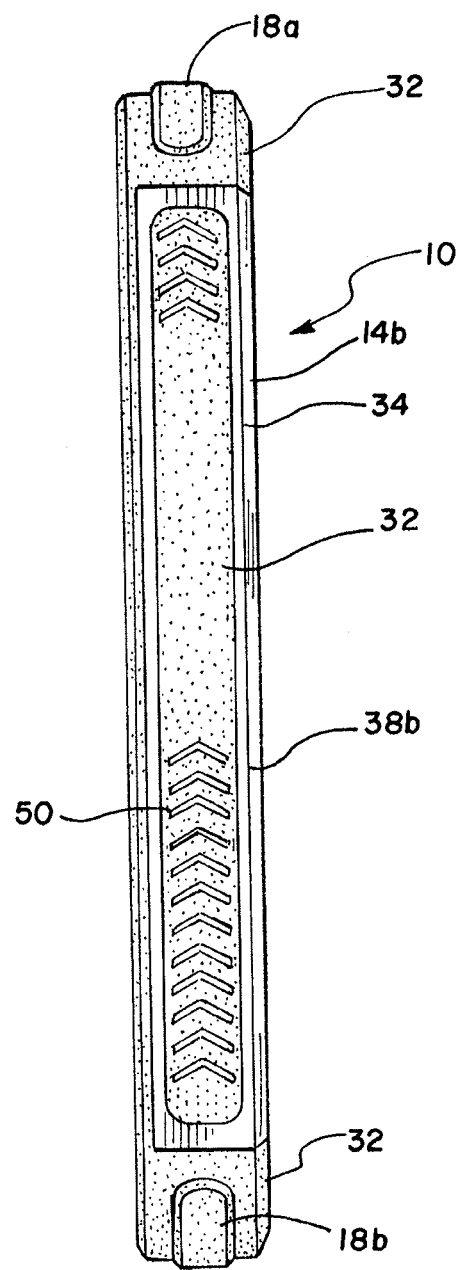
FIG. 4 illustrates a side view of a case for a mobile device, according to an embodiment of the present disclosure.

FIG. 4 illustrates a side view of the case 10 showing the outer surface 38*b* of one of the side walls 14. The exterior layer 34 extends upward from the base wall 12 (shown in FIG. 2) to form a portion of the outer surface 38*b* of the side wall 14*b*. The interior layer 32 of the base wall 12 extends upward from the base wall 12 to form a portion of the outer surface 38*b* of the side wall 14*b*. The interior layer 32 may pass through a portion of the exterior layer 34. The interior layer 32 may form grips 50 on the outer surface 38*b* of the side wall 14*b*, serving a similar function as the grips 44 shown in FIG. 3.

Figure 5:
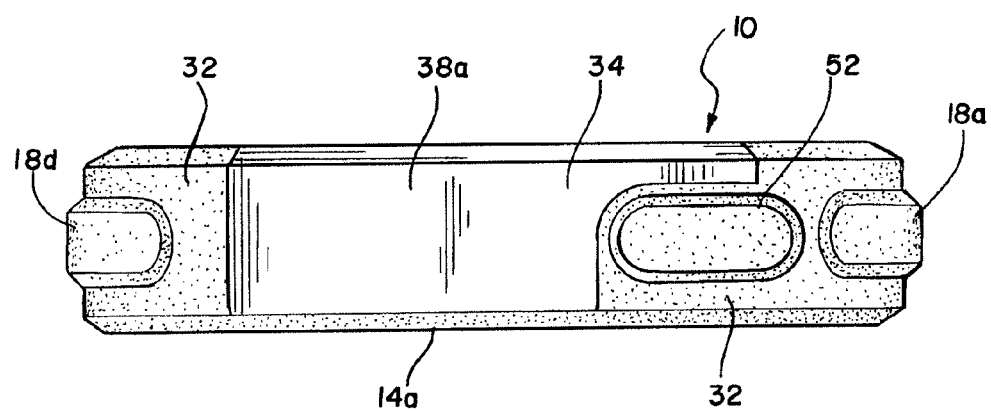
FIG. 5 illustrates a top view of a case for a mobile device, according to an embodiment of the present disclosure.

FIG. 5 illustrates a top view of the case 10 showing the outer surface 38*a* of one of the side walls 14. The exterior layer 34 extends upward from the base wall 12 (shown in FIG. 2) to form a portion of the outer surface 38*a* of the side wall 14*a*. The interior layer 32 of the base wall 12 extends upward from the base wall 12 to form a portion of the outer surface 38*a* of the side wall 14*a*. The interior layer 32 may pass through a portion of the exterior layer 34. The interior layer 32 may form a depressible portion 52 on the outer surface 38*a* of the side wall 14*a*, that serves a similar function as the depressible portion 46 shown in FIG. 3.

Figure 6:
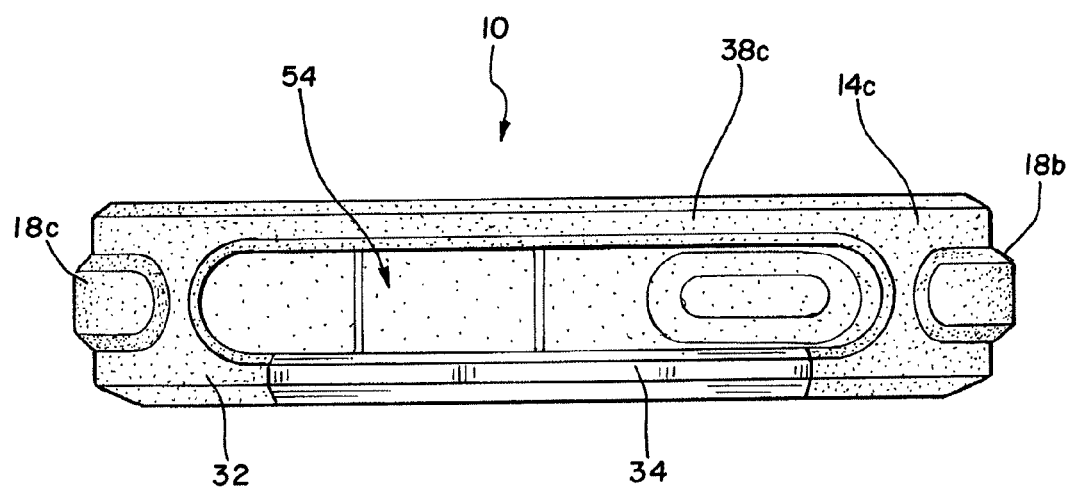
FIG. 6 illustrates a bottom view of a case for a mobile device, according to an embodiment of the present disclosure.

FIG. 6 illustrates a bottom view of the case 10 showing the outer surface 38*c* of one of the side walls 14. The exterior layer 34 extends upward from the base wall 12 (shown in FIG. 2) to form a portion of the outer surface 38*c* of the side wall 14*c*. The interior layer 32 of the base wall 12 extends upward from the base wall 12 to form a portion of the outer surface 38*c* of the side wall 14*c*. The interior layer 32 may pass through a portion of the exterior layer 34. An aperture 54 may be positioned on the side wall 14*c* to allow access to the mobile device through the case 10. The aperture 54 shown in FIG. 6 allows access to electrical connectors on the mobile device.

In one embodiment, the interior layer 32 may not extend through the exterior layer 34 of the side walls 14 shown in FIGS. 3-6. In one embodiment, the interior layer 32 may pass through any portion of the exterior layer 34 of the side walls 14 as desired. In an embodiment in which the interior layer 32 is a pliable material, and the exterior layer 34 is a rigid material, the proportionate amount of interior layer 32 that extends through the exterior layer 34 may be determined based on the total amount of pliability or rigidity desired for the side walls 14 of the case 10. A rigid exterior layer 34 extending over the side walls 14 may form a rigid shell around the interior layer 32.

Figure 7:
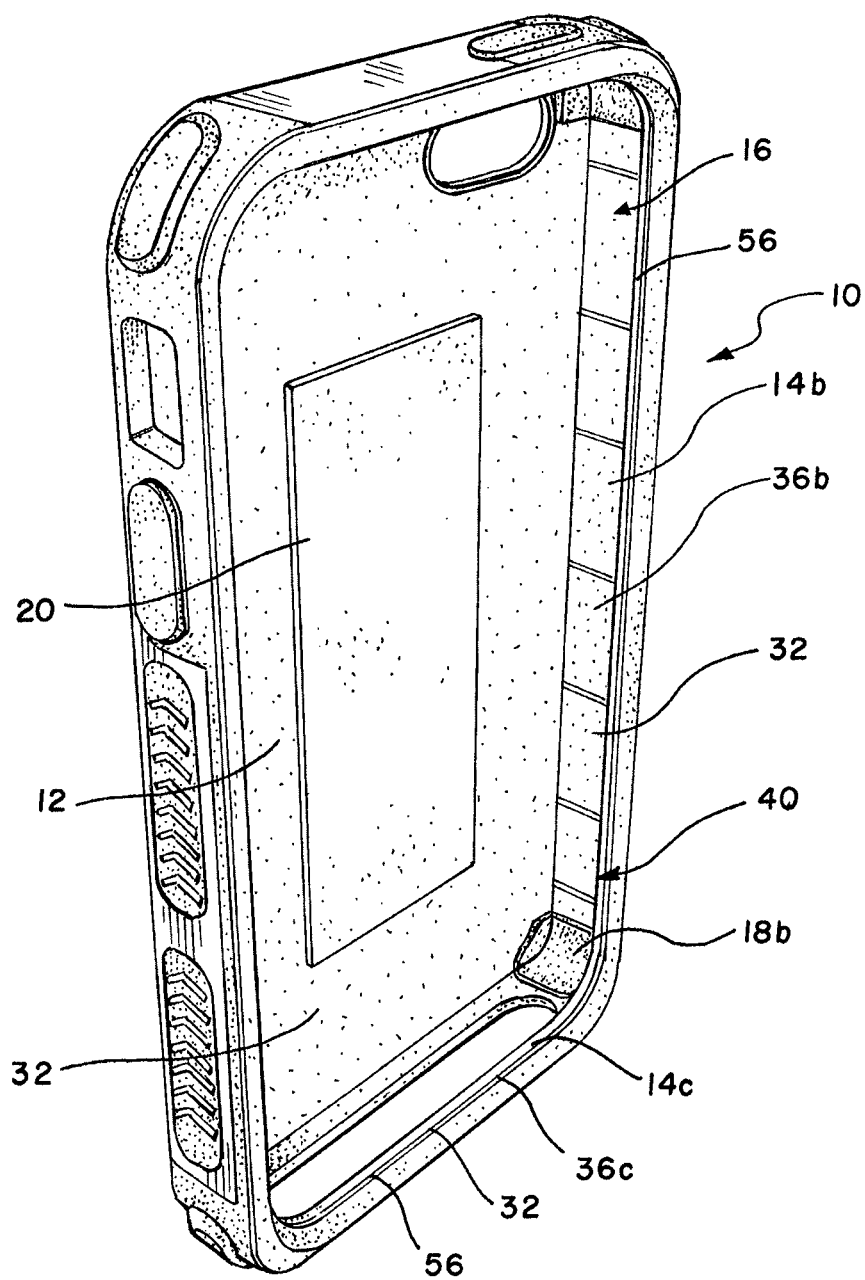
FIG. 7 illustrates a front side perspective view of a case for a mobile device, according to an embodiment of the present disclosure.

FIG. 7 illustrates a front side perspective view of the case 10. The interior surfaces 36*b*, 36*c* of two of the side walls 14 are shown. The interior layer 32 of the base wall 12 extends upward from the base wall 12 to form a portion of the interior surfaces 36*b*, 36*c* of the side walls 14*b*, 14*c*.

A lip 56 extends from the side walls 14 towards the interior of the case 10. The lip 56 is positioned at an end of the side walls 14 that is opposite an end of each of the side walls 14 fixed to the base wall 12. The lip 56 is configured to retain the mobile device within the recess 16 upon the mobile device being inserted into the recess 16. The lip 56 may extend continuously around the side walls 14 of the case 10 or may extend over only a portion of at least one of the side walls 14. The lip 56 may be formed from the material forming the interior layer 32 of the base wall 12. The lip 56 may define the bounds of the aperture 40 that the mobile device passes through to be received by the recess 16.

A portion of each of the side wall cushion devices 18 extends into the interior of the case 10. The portion of the side wall cushion devices 18 that extends into the interior of the case 10 is configured to contact the mobile device to cushion the mobile device from a force.

Figure 8:
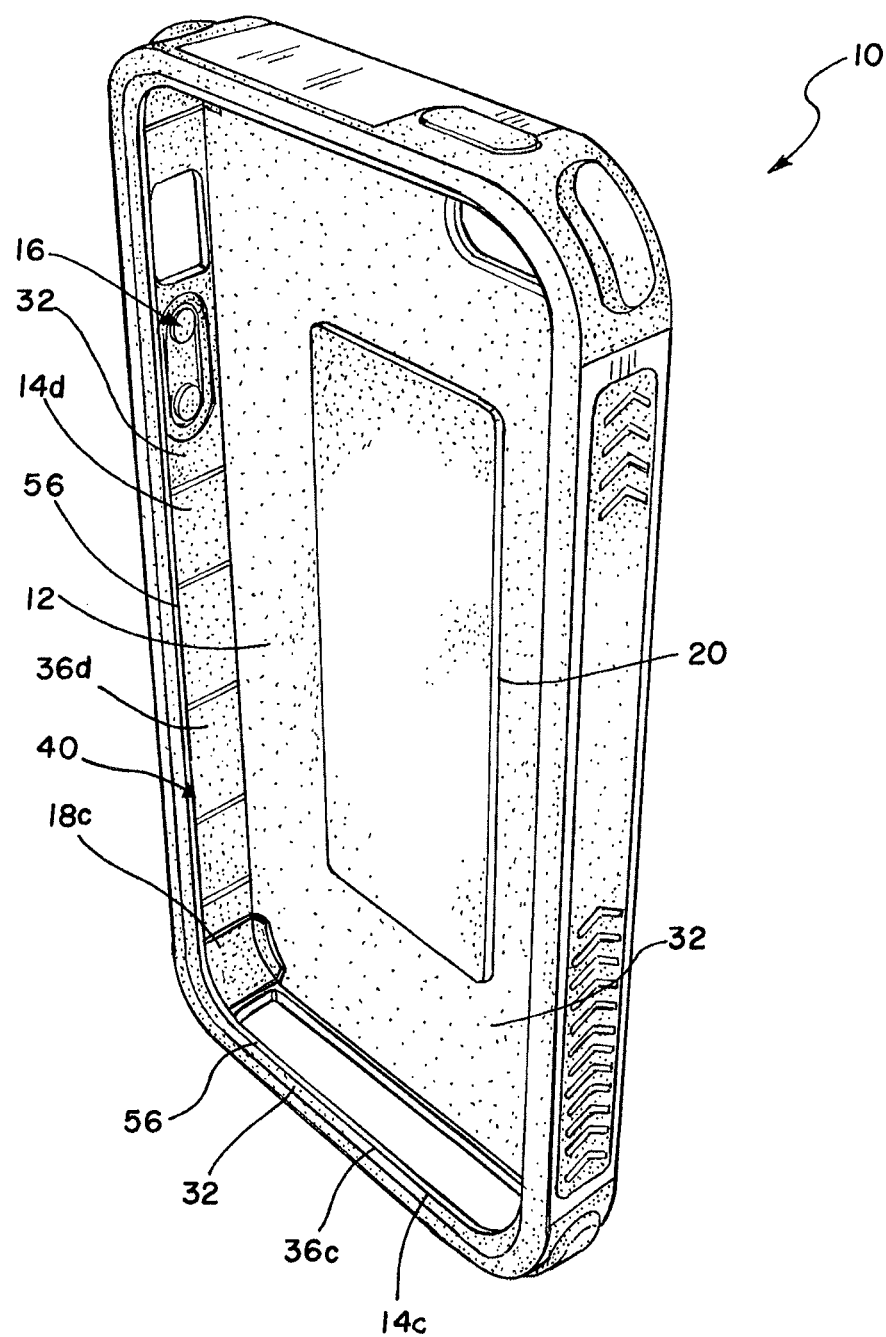
FIG. 8 illustrates a front side perspective view of a case for a mobile device, according to an embodiment of the present disclosure.

FIG. 8 illustrates a front side perspective view of the case 10. The interior surfaces 36*c*, 36*d* of two of the side walls 14 are shown. The interior layer 32 of the base wall 12 extends upward from the base wall 12 to form a portion of the interior surfaces 36*c*, 36*d* of the side walls 14*c*, 14*d*.

Figure 9:
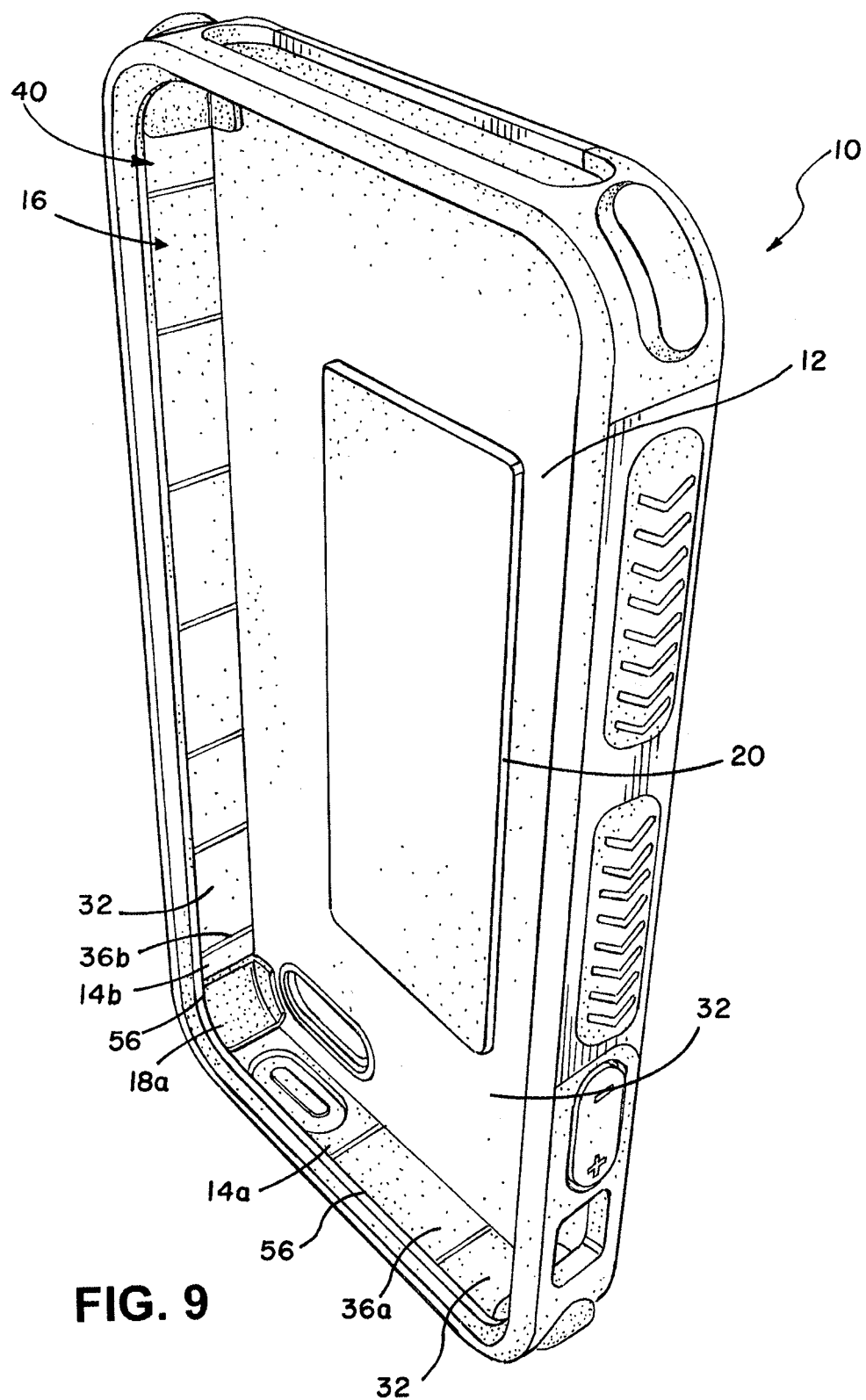
FIG. 9 illustrates a front side perspective view of a case for a mobile device, according to an embodiment of the present disclosure.

FIG. 9 illustrates a front side perspective view of the case 10. The interior surfaces 36*a*, 36*b* of two of the side walls 14 are shown. The interior layer 32 of the base wall 12 extends upward from the base wall 12 to form a portion of the interior surfaces 36*a*, 36*b* of the side walls 14*a*, 14*b*.

Figure 10:
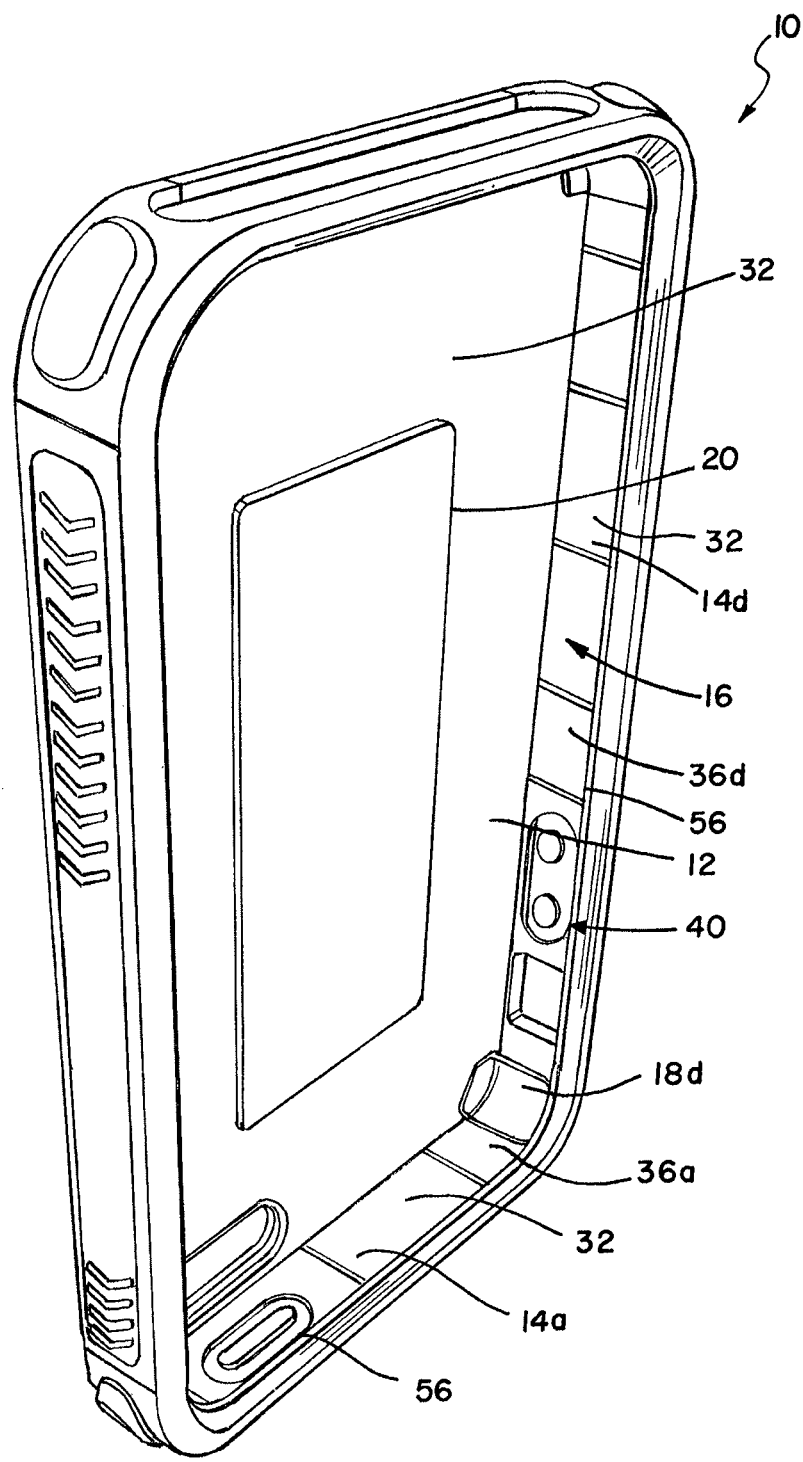
FIG. 10 illustrates a front side perspective view of a case for a mobile device, according to an embodiment of the present disclosure.

FIG. 10 illustrates a front side perspective view of the case 10. The interior surfaces 36*a*, 36*d* of two of the side walls 14 are shown. The interior layer 32 of the base wall 12 extends upward from the base wall 12 to form a portion of the interior surfaces 36*a*, 36*d* of the side walls 14*a*, 14*d*.

Figure 11:
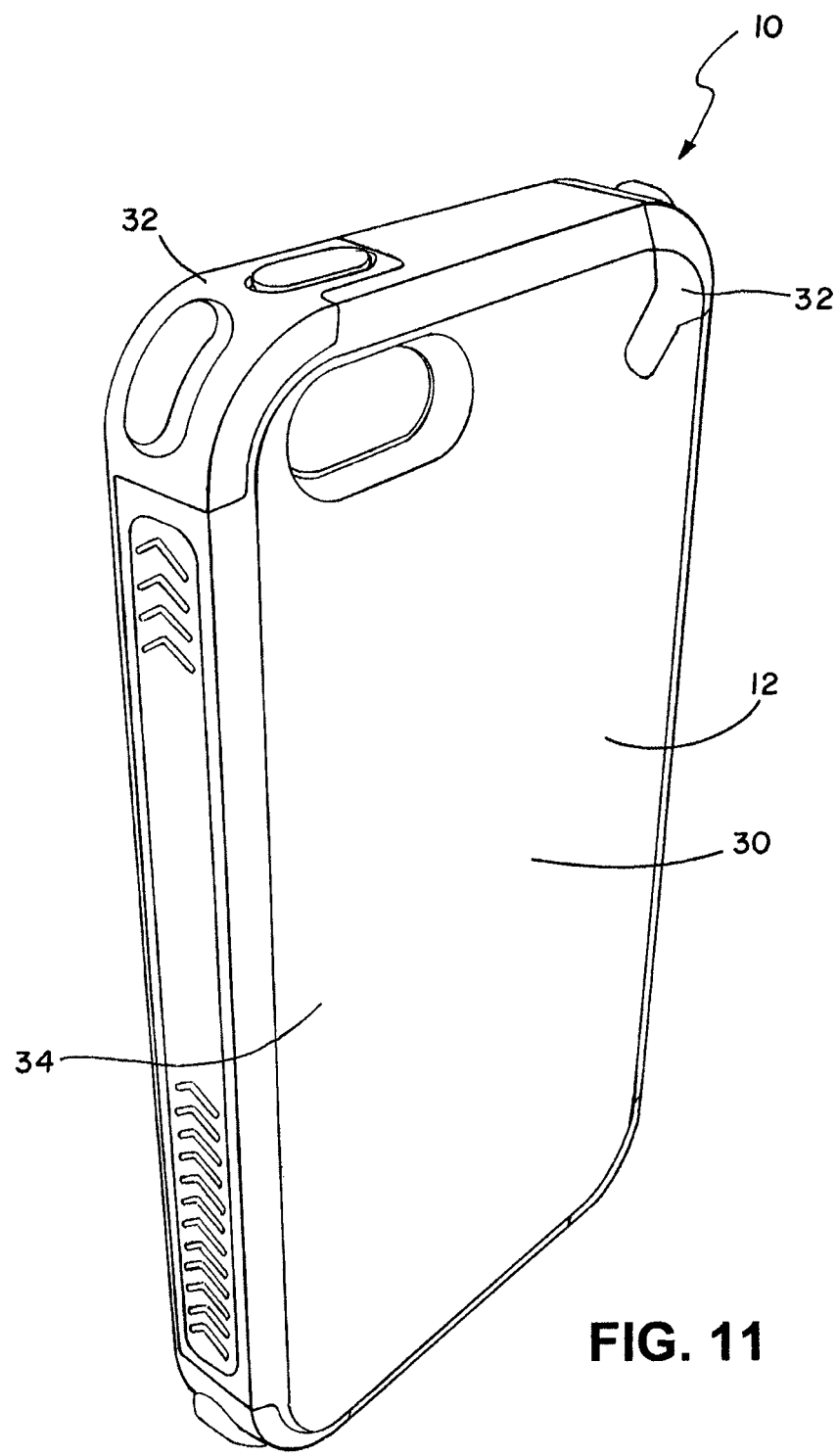
FIG. 11 illustrates a rear side perspective view of a case for a mobile device, according to an embodiment of the present disclosure.

FIG. 11 illustrates a rear side perspective view of the case 10.

Figure 12:
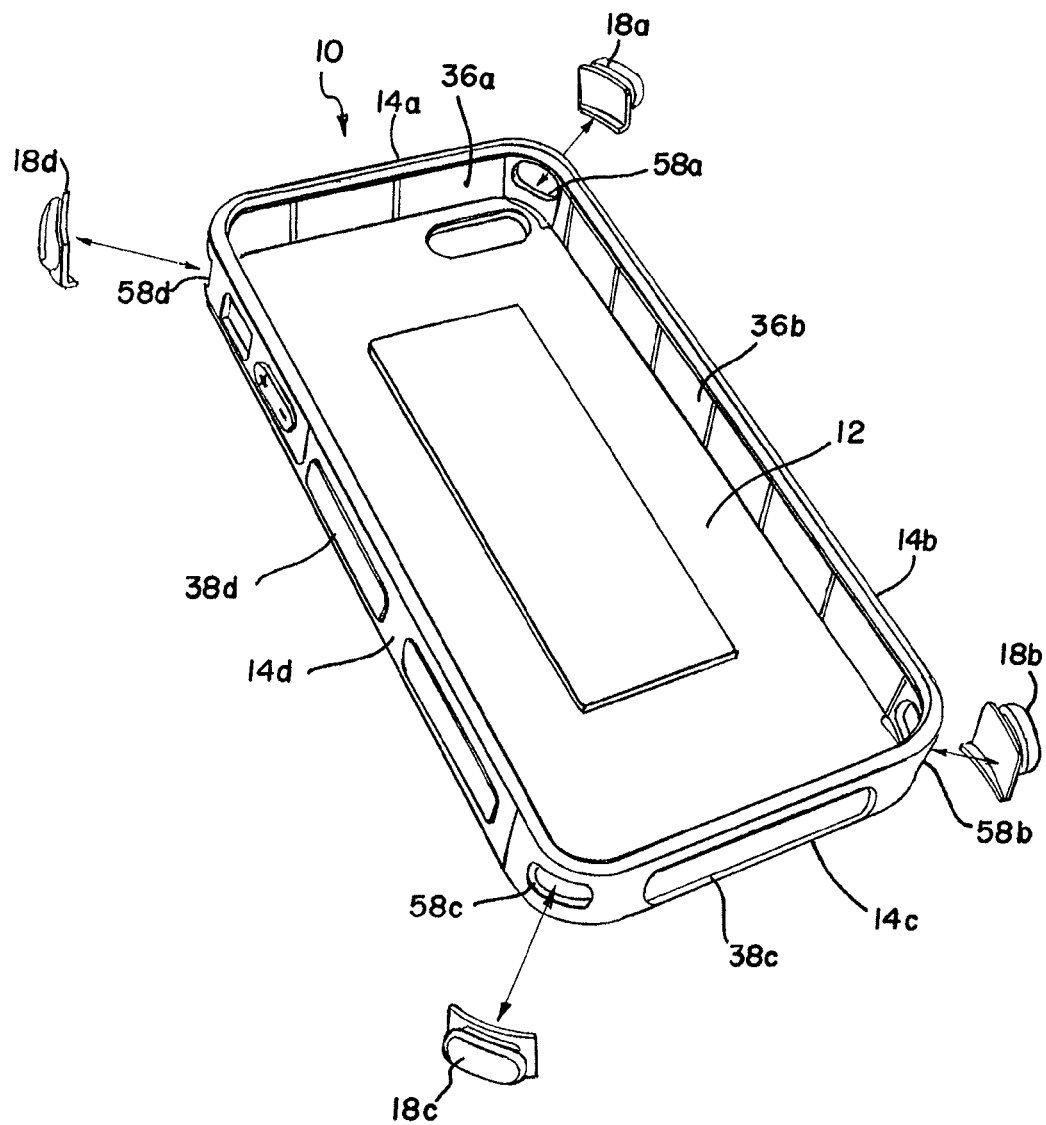
FIG. 12 illustrates a front side perspective view of a case for a mobile device showing side wall cushion devices separated from side walls and a base wall of the case, according to an embodiment of the present disclosure.

FIG. 12 illustrates an embodiment of the case 10 in which the side wall cushion devices 18 are removable from the side walls 14 and the base wall 12 of the case 10. The side wall cushion devices 18 are shown separated from the side walls 14 and the base wall 12 of the case 10. The case 10 is not intended to be in an operable mode when the side wall cushion devices 18 are removed, because the mobile device may not properly fit within the case 10 without the cushion devices 18 in place. The apertures 58*b* and 58*d* are configured similarly as the apertures 58*a* and 58*c*.

Figure 13:
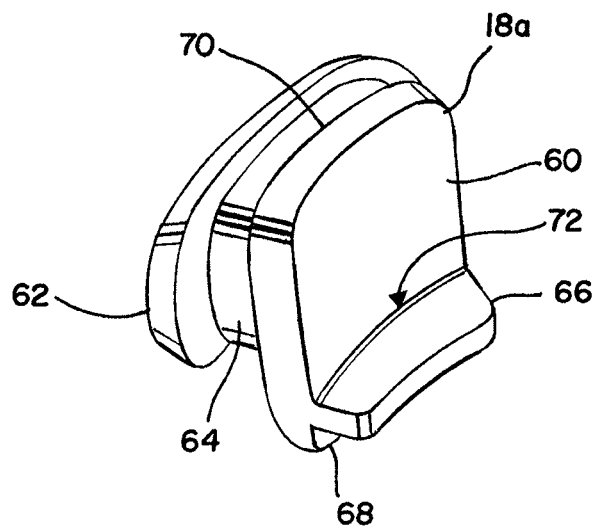
FIG. 13 illustrates a front perspective view of a side wall cushion device, according to an embodiment of the present disclosure.

FIG. 13 illustrates a front perspective view of one of the side wall cushion devices 18. Each of the side wall cushion devices 18 shown in FIG. 12 may be configured similarly as the cushion device 18*a* shown in FIG. 13. In one embodiment, any or all of the cushion devices 18 may be configured differently, as desired.

The side wall cushion device 18*a* includes an inner flange 60 and an outer flange 62 connected by a neck 64. The inner flange 60 is a portion of the cushion device 18*a* positioned interior of the side walls 14 when the cushion device 18*a* is inserted through a respective aperture 58*a* (shown in FIG. 12). The outer flange 62 is a portion of the cushion device 18*a* positioned exterior of the side walls 14 when the cushion device 18*a* is inserted through a respective aperture 58*a*. The outer flange 62 and inner flange 60 may secure the cushion device 18*a* within the aperture 58*a*. The neck 64 is positioned within the respective aperture 58*a* when the cushion device 18*a* extends through the aperture 58*a*.

The outer flange 62 is preferably sized larger than the size of the respective aperture 58*a* (shown in FIG. 12) to prevent the cushion device 18*a* from becoming dislodged from the aperture 58*a*. The outer flange 62 is preferably sized to have an outer surface area that is large, and larger than the area of the aperture 58a, to provide material that receives and absorbs force applied to the outer flange 62.

The outer flange 62 may have a shape that contours to the shape of the respective outer surfaces 38a, 38b of the side walls 14a, 14b (shown in FIGS. 4 and 5). The outer flange 62 may have a curved or angled shape when the cushion device 18a is positioned at the corner of the case 10. The outer flange 62 may have sufficient length to cover the respective outer surfaces 38a, 38b of side walls 14a, 14b at the corner of the case 10, to absorb force applied to the corner of the case 10. In the embodiment shown in FIG. 13, the outer flange 62 has an oblong or oval shape. In other embodiments, the outer flange 62 may have any shape that retains the cushion device 18a within the respective aperture 58a as desired.

The inner flange 60 is preferably sized larger than the size of the respective aperture 58a (shown in FIG. 12) to prevent the cushion device 18a from becoming dislodged from the aperture 58a. The inner flange 60 is preferably sized to have an interior surface area that is large, and larger than the area of the aperture 58a, to provide material that absorbs force applied to the outer flange 62 and preferably does not deliver the entirety of the force to the mobile device.

The inner flange 60 may include a horizontal support 66, a stabilizer 68, and a vertical support 70. The vertical support 70 may be contoured to form a corner recess 72.

The horizontal support 66 may comprise a flattened protrusion extending outward from the inner flange 60. When the cushion device 18a is inserted into the respective aperture 58a (shown in FIG. 12), the horizontal support 66 may extend such that a portion of the mobile device may rest upon the horizontal support 66. The horizontal support 66 may have a thickness, or distance, from the base wall 12 (shown in FIG. 1) such that the mobile device does not contact the base wall 12 when resting upon the horizontal support 66. The horizontal support 66 may reduce the possibility that force is directly transmitted from the base wall 12 to the mobile device through contact therebetween.

The stabilizer 68 may comprise a ridge that extends from the inner flange 60 and contacts a portion of the base wall 12 (shown in FIG. 1). The stabilizer 68 may contact the base wall 12 to align the inner flange 60 in position when it is inserted through the respective aperture 58a (shown in FIG. 12).

The vertical support 70 may comprise a flattened wall that fits against and covers the respective interior surfaces 36a, 36b of the side walls 14a, 14b (shown in FIG. 9). When the cushion device 18a is inserted into the respective aperture 58a (shown in FIG. 12), the vertical support 70 may extend such that a portion of the mobile device may press against the vertical support 70. The vertical support 70 may have a thickness, or distance, from the respective side walls 14a, 14b (shown in FIG. 9) such that the mobile device does not contact the respective side walls 14a, 14b when pressing against the vertical support 70. The vertical support 70 may reduce the possibility that force is directly transmitted from one of the side walls 14 to the mobile device through contact therebetween. The vertical support 70 may have a height, or distance, such that an entire height of the respective inner surfaces 36a, 36b of the side walls 14a, 14b below the lip 56 are filled with the vertical support 70.

The corner recess 72 is shaped to receive a corner of the mobile device. The vertical support 70 may be curved to extend around the corner of the mobile device to provide cushioning support for the corner in directions towards both of the adjacent side walls 14a, 14b (shown in FIG. 9).

In other embodiments, the inner flange 60 may have any shape as desired to provide cushioning for the mobile device when retained by the case. For example, in an embodiment in which the cushion support 18a is not utilized in the corner of the case, but is rather utilized along a midpoint of one of the side walls, then the vertical support 70 may not be contoured to include a corner recess 72.

Figure 14:
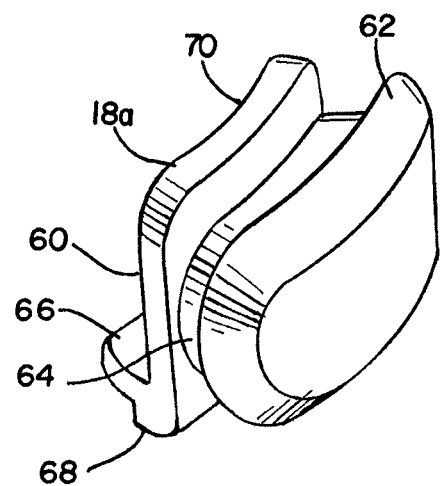
FIG. 14 illustrates a rear perspective view of a side wall cushion device, according to an embodiment of the present disclosure.

FIG. 14 illustrates a rear perspective view of the side wall cushion device 18a showing the outer flange 62. In one embodiment, the outer flange 62 and/or inner flange 60 may be configured such that the outer flange 62 and/or inner flange 60 must deform to allow the cushion device 18 to pass through the respective aperture 58a, to allow the cushion device 18a to be retained within the aperture 58a, or removed from the aperture 58a.

Figure 15:
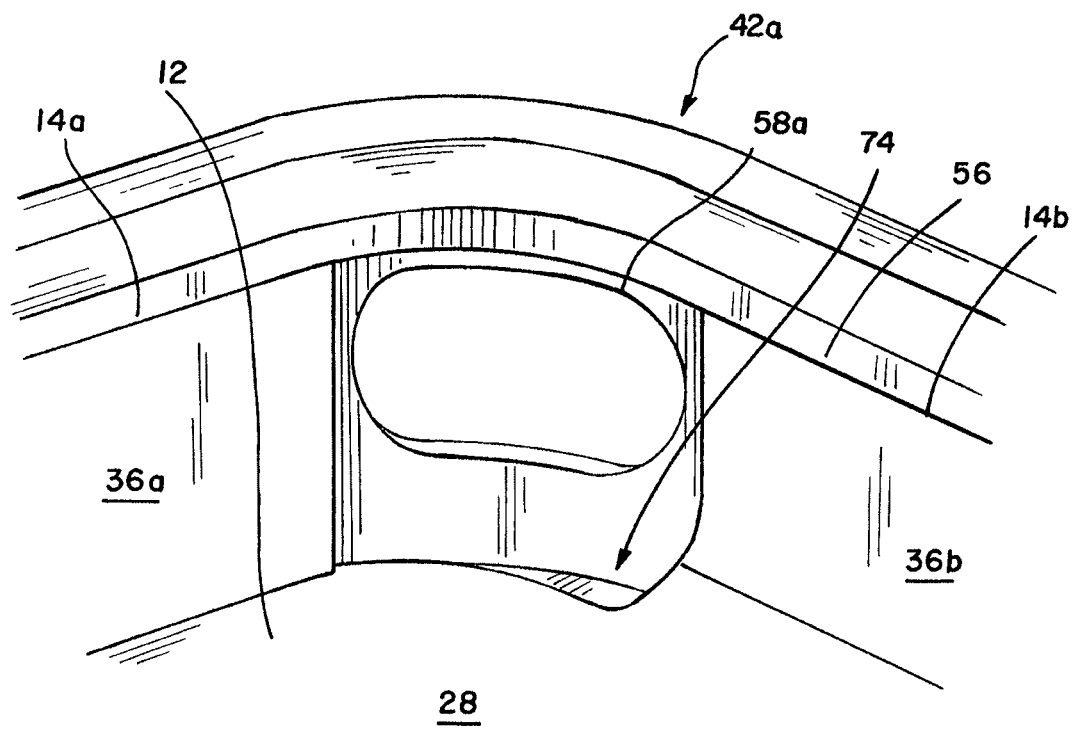
FIG. 15 illustrates a perspective view of a corner of a case, according to an embodiment of the present disclosure.

FIG. 15 illustrates a detail view of one of the corners 42 of the case 10, with the respective side wall cushion device 18a removed. Each of the corners 42 shown in FIGS. 7-10 may be configured similarly as the corner 42a shown in FIG. 15. In one embodiment, any or all of the corners 42 may be configured differently, as desired.

Two of the side walls 14a, 14b join at the corner 42a, and the aperture 58a extends through a portion of each of the side walls 14a, 14b. Each of the side walls 14a, 14b join with each other at approximately a midpoint of the aperture 58a. The side walls 14a, 14b may be mechanically joined at the aperture 58a or may be integrally formed such that they are joined with one another at the aperture 58a. The ends of the side walls 14a, 14b entirely encircle the cushion device 18a when it is inserted through the aperture 58a. In one embodiment, the aperture 58a may be positioned at the corner 42a, but may be offset from the position shown in FIG. 15, such that the aperture 58a only extends through one of the two side walls 14a, 14b.

A side wall recess 74 is cut into the side walls 14a, 14b at the corner 42a. The side wall recess 74 is preferably shaped to securely receive and retain the side wall cushion device 18a when it is passed through the aperture 58a.

Figure 16:
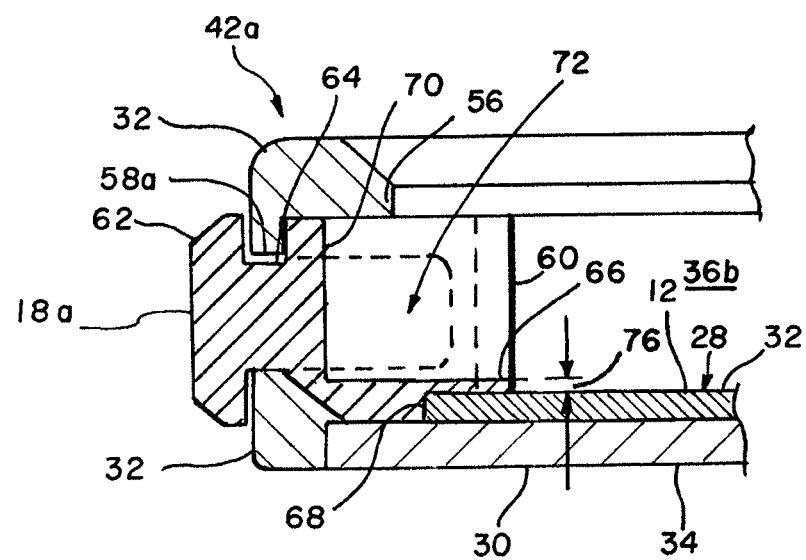
FIG. 16 illustrates a cross sectional view of a corner of a case, according to an embodiment of the present disclosure.

FIG. 16 illustrates a cross sectional view of one of the corners 42a of the case 10, with the respective side wall cushion device 18a extending through the aperture 58a. Each of the corners 42 shown in FIGS. 7-10 may be configured similarly as the corner 42a shown in FIG. 16. In one embodiment, any or all of the corners 42 may be configured differently, as desired.

The cushion device 18a fills the side wall recess 74 shown in FIG. 15. The outer flange 62 is positioned exterior to the respective side walls 14a, 14b (shown in FIG. 15). The inner flange 60 is positioned interior to the respective side walls 14a, 14b. The stabilizer 68 abuts the interior layer 32 and the exterior layer 34 to align the inner flange 60 in position when it is inserted through the aperture 58a. The horizontal support 66 abuts the interior layer 32 and extends at a distance 76 from the interior surface 28 of the base wall 12. The distance 76 allows a gap to form between the mobile device and the inner surface 28 of the base wall 12 when the mobile device is received by the recess 16. The vertical support 70 abuts the inner surfaces 36a, 36b (shown in FIG. 15) and extends at a distance from the inner surfaces, as more clearly shown in FIG. 17.

Figure 17:
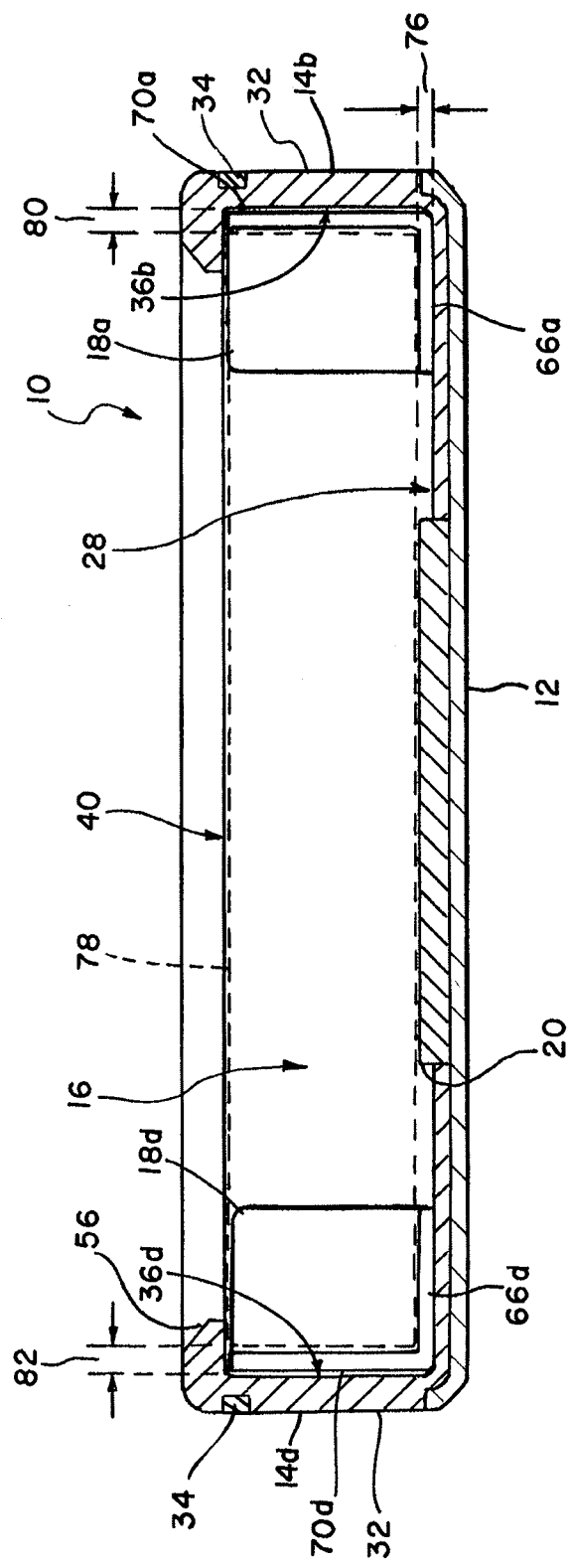
FIG. 17 illustrates a cross sectional view taken along a width of a case, according to an embodiment of the present disclosure.

FIG. 17 illustrates a cross sectional view taken along a width of the case 10. An exemplary mobile device 78 is shown in outline that has been received by the recess 16 of the case 10. Like components of the side wall cushion devices 18a, 18d have been marked with lettering for identification purposes (vertical support 70a, 70d, horizontal support 66a, 66d), such components having similar properties as discussed regarding the vertical support 70 and the horizontal support 66.

The vertical supports 70a, 70d extend at respective distances 80, 82 from respective inner surfaces 36b, 36d of the side walls 14b, 14d. The distances 80, 82 allow gaps to form between the mobile device and the respective inner surfaces 36b, 36d of the side walls 14b, 14d when the mobile device 78 is received by the recess 16. The distance 76 of the respective horizontal supports 66a, 66d from the inner surface 28 of the base wall 12 is shown, with a gap shown between the inner surface 28 of the base wall 12 and the mobile device 78.

The distance 76 of the respective horizontal supports 66a, 66d from the inner surface 28 may match a distance that the base wall cushion device 20 has from the inner surface 28 of the base wall 12. The base wall cushion device 20 extends from the base wall 12 to a distance 76 such that the mobile device 78 contacts the base wall cushion device 20 and a gap exists between the mobile device 78 and the inner surface 28 of the base wall 12 when the mobile device 78 is received in the recess 16. The combination of the distances 76 of the cushion devices 18, 20 from the base wall 12 may collectively elevate the mobile device 78 above the inner surface 28 of the base wall 12. The lip 56 forms the upper restraint on the mobile device 78. The cushion devices 18, 20 may be configured to press the mobile device 78 against the lip 56 to secure the mobile device 78 within the recess 16. In one embodiment, the distance of the base wall cushion device 20 from the inner surface 28 of the base wall 12 may differ from the corresponding distances of the cushion devices. In an embodiment in which side wall cushion devices are not utilized, the base wall cushion device 20 may solely form the gap between the mobile device 78 and the base wall 12. In an embodiment in which a base wall cushion device is not utilized, the side wall cushion devices 18 may solely form the gap between the mobile device 78 and the base wall 12.

Figure 18:
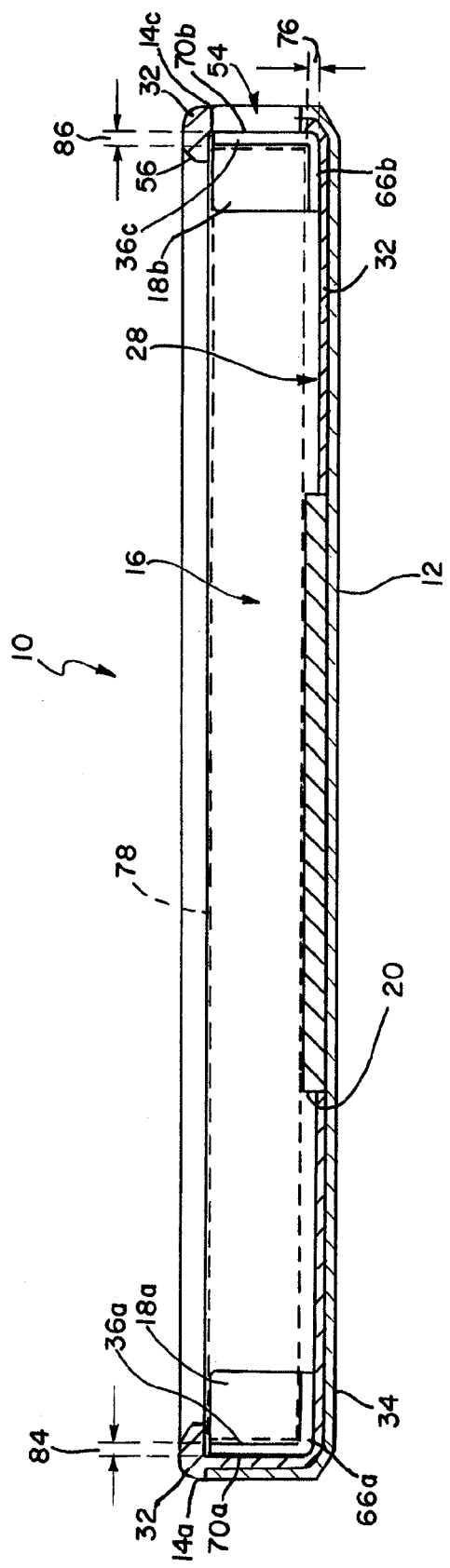
FIG. 18 illustrates a cross sectional view taken along a length of a case, according to an embodiment of the present disclosure.

FIG. 18 illustrates a cross sectional view taken along a length of the case 10. Like components of the side wall cushion devices 18a, 18b have been marked with lettering for identification purposes (vertical support 70a, 70b, horizontal support 66a, 66b), such components having similar properties as discussed regarding the vertical support 70 and the horizontal support 66.

The vertical supports 70a, 70b extend at respective distances 84, 86 from respective inner surfaces 36a, 36c of the side walls 14a, 14c. The distances 84, 86 serve similar functions as the distances 80, 82 discussed in regard to FIG. 17, namely, the distances 84, 86 allow gaps to form between the mobile device and the respective inner surfaces 36a, 36c of the side walls 14a, 14c when the mobile device 78 is retained by the case 10.

Figure 19:
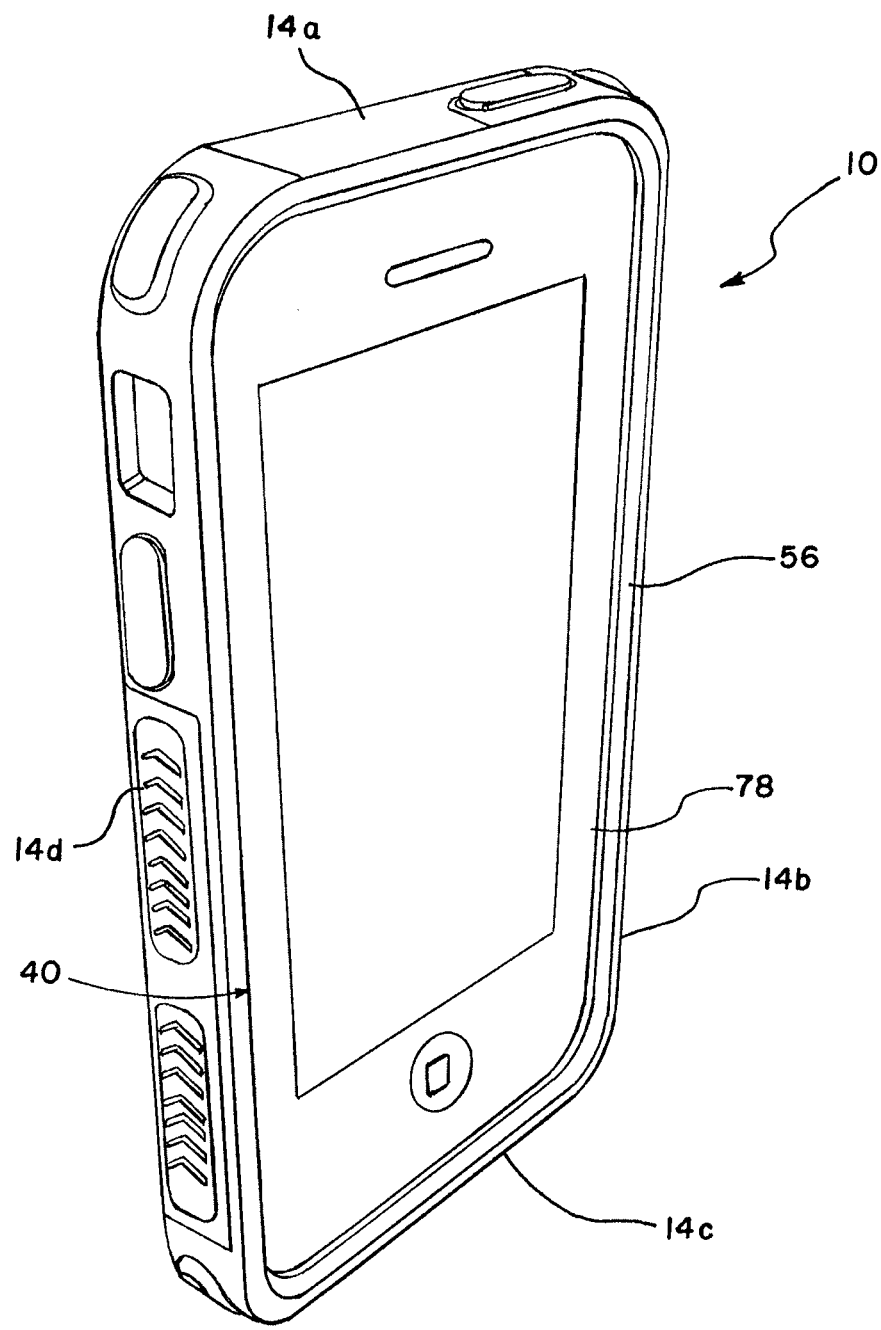
FIG. 19 illustrates a front perspective view of a case with a mobile device received by a recess of the case, according to an embodiment of the present disclosure.

FIG. 19 illustrates a front perspective view of the case 10 with the mobile device 78 received by the recess 16 (shown in FIG. 7). The lip 56 overlaps a front surface of the mobile device 78 to secure the device 78 within the recess 16. The aperture 40 allows a user to access front portions of the mobile device 78.

The case 10 may be configured as a form-fit case, as illustrated in FIG. 19, or may be configured as a bulky shell that does not tightly fit the contours of the mobile device. A form-fit case has a base wall and side walls that are positioned substantially at the outer surfaces of the mobile device. The case 10 may be shaped to fit a particular intended model of mobile device, or may be shaped to fit multiple different models of mobile devices. The case 10 may be sized as desired, to fit a corresponding mobile device. The case 10 may be formed as a single piece case, in which the side wall cushion devices 18 are permanently joined to the side walls 14, and the entire case forms a single piece. The case 10 may be formed as a multi-piece case, as shown in FIG. 12, for example, in which side wall cushion devices 18 are removable from the side walls 14, or any other number of pieces are utilized to cover the mobile device. For example, in one embodiment, a cover may be fit over the side of the case 10 opposite the base wall 12, to form a case 10 covering the mobile device on six sides.

The case 10 may be configured to cover a back surface of the mobile device, or a front surface of the mobile device, or both, if desired.

The mobile device is preferably a personal electronic device such as a phone, a computer, a digital assistant, hand held device, or the like. The phone may comprise a cellular, or mobile phone, and may include a touch screen. The case 10 may be configured to cover the side of the phone opposite the touch screen, to protect the back of the phone from impact and/or scratches. The case 10 may also be configured to cover portions of the touch screen, with cut outs or apertures in place to allow access to the desired elements of the touch screen. The computer may comprise a tablet computer or the like, which may similarly include a touch screen accessible with the case 10 in place. The hand held device may comprise a personal digital assistant or the like, which may similarly include a touch screen accessible with the case 10 in place.

The case 10 beneficially covers and protects the desired mobile device while offering shock protection for the mobile device. Impact dampening material is strategically placed to absorb shock in a drop event. Such protection may extend the life of the mobile device by reducing the possibility of damage to electronic components within the mobile device. The cushion devices disclosed herein may absorb a force applied to the case by deforming to absorb the force or by providing shock resistance in any other manner desired. The cushion devices may additionally separate the mobile device away from the surfaces of the base wall and the side walls to reduce the force transmitted from these surfaces to the mobile device. The mobile device may float, or be suspended upon the cushion devices to reduce shock to the mobile device. In an embodiment in which a base wall cushion device 20 and side wall cushion devices 18 are used, the mobile device may be suspended at five points by the impact protection material of the cushion devices.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A case for a mobile device comprising:
a base wall having an inner surface and an outer surface and being configured to cover a surface of the mobile device;
a plurality of side walls each having an inner surface and an outer surface and being configured to cover a side surface of the mobile device, the plurality of side walls extending from the base wall such that the inner surfaces of the plurality of side walls and the inner surface of the base wall form a recess configured to receive the mobile device, the plurality of side walls having a plurality of apertures;
a plurality of cushion devices each extending through a respective one of the plurality of apertures and being configured to cushion the mobile device from a force exerted upon the case, and being removable from the respective one of the plurality of apertures, each of the plurality of cushion devices having an outer flange and an inner flange, the outer flange covering the outer surface of at least one of the plurality of side walls, the inner flange covering the inner surface of at least one of the plurality of side walls and extending from the inner surface of the base wall to a distance such that the mobile device contacts the inner flange and a gap exists between the mobile device and the inner surface of the base wall when the mobile device is received in the recess.

2. The case of claim 1, wherein the plurality of side walls form at least two corners of the case, and each of the plurality of apertures is positioned at a respective one of the at least two corners.

3. The case of claim 1, wherein the inner flange contacts the inner surface of the base wall.

4. The case of claim 1, wherein each of the plurality of cushion devices is configured such that the inner flange or the outer flange of the respective cushion device must deform to allow the respective cushion device to be removed from the respective aperture.

5. The case of claim 4, wherein each of the plurality of cushion devices is made of an elastomeric material.

6. A case for a mobile device comprising:
a base wall having an inner surface and an outer surface;
a plurality of side walls each having an inner surface and an outer surface and extending from the base wall, the plurality of side walls and the base wall forming a recess configured to receive the mobile device, the inner surfaces of the plurality of side walls and the inner surface of the base wall configured to face towards the mobile device when the mobile device is received in the recess, and the outer surfaces of the plurality of side walls and the outer surface of the base wall configured to face away from the mobile device when the mobile device is received in the recess;

a cushion device extending through at least one of the plurality of side walls and being removable from the at least one of the plurality of side walls, the cushion device including a flange covering the inner surface of the at least one of the plurality of side walls and extending from the inner surface of the base wall to a distance such that the mobile device contacts the flange and a gap exists between the mobile device and the inner surface of the base wall when the mobile device is received in the recess.

7. The case of claim 6, wherein the cushion device extends through an aperture in the at least one of the plurality of side walls.

8. The case of claim 6, wherein the cushion device is made of an elastomeric material configured to deform to cushion the mobile device from a force exerted upon the case.

9. The case of claim 6, wherein the flange extends from the inner surface of the base wall to a distance such that the mobile device contacts the flange and a gap exists between the mobile device and the inner surface of the base wall such that no portion of the mobile device contacts the base wall when the mobile device is received in the recess.

10. The case of claim 6, wherein the distance that the flange extends from the inner surface of the base wall is substantially equal to the size of the gap.

11. A case for a mobile device comprising:

a base wall having an inner surface and an outer surface and being configured to cover a surface of the mobile device;

a plurality of side walls each having an inner surface and an outer surface and being configured to cover a side surface of the mobile device, the plurality of side walls extending from the base wall such that the inner surfaces of the plurality of side walls and the inner surface of the base wall form a recess configured to receive the mobile device, the plurality of side walls having a plurality of apertures;

a plurality of cushion devices each extending through a respective one of the plurality of apertures and being configured to cushion the mobile device from a force exerted upon the case, and being removable from the respective one of the plurality of apertures, each of the plurality of cushion devices having an outer flange and an inner flange, the outer flange contacting the outer surface of at least one of the plurality of side walls, the inner flange contacting the inner surface of the at least one of the plurality of side walls and extending from the inner surface of the at least one of plurality of side walls to a distance such that the mobile device contacts the inner flange and a gap exists between the mobile device and the inner surface of the at least one of the plurality of side walls when the mobile device is received in the recess.

12. The case of claim 11, wherein the plurality of side walls form at least two corners of the case, and each of the plurality of apertures is positioned at a respective one of the at least two corners.

13. The case of claim 11, wherein each of the plurality of cushion devices is made of an elastomeric material.

14. The case of claim 11, wherein the outer flange and the inner flange secure the respective cushion device within the respective aperture.

15. The case of claim 11, wherein each of the plurality of cushion devices is configured such that the inner flange or the outer flange of the respective cushion device must deform to allow the respective cushion device to be removed from the respective aperture.

16. A case for a mobile device comprising:

a base wall having an inner surface and an outer surface;

a plurality of side walls each having an inner surface and an outer surface and extending from the base wall, the plurality of side walls and the base wall forming a recess configured to receive the mobile device, the inner surfaces of the plurality of side walls and the inner surface of the base wall configured to face towards the mobile device when the mobile device is received in the recess, and the outer surfaces of the plurality of side walls and the outer surface of the base wall configured to face away from the mobile device when the mobile device is received in the recess;

each one of the plurality of side walls joining to an adjacent one of the plurality of side walls to form at least four corners of the case, with an aperture at each one of the at least four corners extending from the inner surface of at least one of the plurality of side walls to the outer surface of at least one of the plurality of side walls;

at least four cushion devices, each configured to cushion the mobile device from a force exerted upon the case and extending through a respective one of the apertures and having an inner flange and an outer flange positioned on opposite sides of the respective aperture, the inner flange configured to contact the mobile device when the mobile device is received in the recess; and a cushion device fixed to the inner surface of the base wall and being configured to cushion the mobile device from a force exerted upon the case, and extending from the inner surface of the base wall to a distance such that the mobile device contacts the cushion device fixed to the inner surface of the base wall and a gap exists between the mobile device and the inner surface of the base wall when the mobile device is received in the recess.

17. The case of claim 16, wherein the inner flange and outer flange secure the respective one of the at least four cushion devices within the respective aperture.

18. The case of claim 16, wherein the inner flange contacts the inner surface of at least one of the plurality of side walls, and the outer flange contacts the outer surface of at least one of the plurality of side walls.

19. The case of claim 16, wherein the inner flange covers the inner surface of at least one of the plurality of side walls, and the outer flange covers the outer surface of at least one of the plurality of side walls.

20. The case of claim 16, wherein the cushion device fixed to the inner surface of the base wall is fixed to the inner surface of the base wall with an adhesive.

* * * * *